US012123747B2

United States Patent
Schuiling et al.

(10) Patent No.: US 12,123,747 B2
(45) Date of Patent: Oct. 22, 2024

(54) MOUNTING SYSTEM, A WINDOW ASSEMBLY INCLUDING THE SAME, AND A METHOD OF FORMING THE WINDOW ASSEMBLY

(71) Applicant: AGC Automotive Americas Co., Alpharetta, GA (US)

(72) Inventors: Aaron Schuiling, Holly, MI (US); Adam Patrick, Lincoln Park, MI (US); Michael McBryar, Farmington Hills, MI (US); Ian Hatzilias, Sterling Heights, MI (US); Matthew Collins, Elizabethtown, KY (US)

(73) Assignee: AGC Automotive Americas Co., Alpharetta, GA (US)

( * ) Notice: Subject to any disclaimer, the term of this patent is extended or adjusted under 35 U.S.C. 154(b) by 0 days.

(21) Appl. No.: 18/431,403

(22) Filed: Feb. 2, 2024

(65) Prior Publication Data

US 2024/0263975 A1 Aug. 8, 2024

Related U.S. Application Data

(60) Provisional application No. 63/443,580, filed on Feb. 6, 2023.

(51) Int. Cl.
*G01D 11/26* (2006.01)
*B32B 17/10* (2006.01)
(Continued)

(52) U.S. Cl.
CPC ........ *G01D 11/26* (2013.01); *B32B 17/10036* (2013.01); *B32B 17/10165* (2013.01);
(Continued)

(58) Field of Classification Search
CPC .............. G01D 11/26; B32B 17/10036; B32B 17/10165; B32B 2307/536;
(Continued)

(56) References Cited

U.S. PATENT DOCUMENTS 6,250,148 B1 6/2001 Lynam
6,795,237 B1 9/2004 Marinelli et al.
(Continued)

FOREIGN PATENT DOCUMENTS

DE 10 2006 059 554 A1 6/2008
DE 10 2019 134 006 A1 6/2021
WO 2019081315 A1 5/2019

OTHER PUBLICATIONS

ASTM International, "ASTM D638-22,, Standard Test Method for Tensile Properties of Plastics", 2022, 16 pages.
(Continued)

*Primary Examiner* — Seung C Sohn
(74) *Attorney, Agent, or Firm* — Howard & Howard Attorneys PLLC

(57) ABSTRACT

A mounting system configured to support a component relative to a mounting surface of a vehicle includes a mounting bracket including a mounting portion configured to be coupled to the mounting surface of the vehicle. The mounting bracket defining a component receptacle configured to support the component. The mounting bracket comprises a first plastic material. The mounting system also includes a seal coupled to the mounting bracket and configured to engage the mounting surface of the vehicle to inhibit ingress of debris between the mounting portion and the mounting surface of the vehicle. The seal comprises a second plastic material, different than the first plastic material. The mounting system may be included in a window assembly where the mounting surface of the vehicle is an
(Continued)

inner surface of a transparent pane and the component is a sensor.

20 Claims, 12 Drawing Sheets

(51) Int. Cl.
    *B60R 1/04*       (2006.01)
    *C08L 67/02*     (2006.01)
    *C08L 75/04*     (2006.01)
    *C08L 77/02*     (2006.01)
    *C09K 3/10*      (2006.01)

(52) U.S. Cl.
    CPC .............. *B60R 1/04* (2013.01); *C08L 67/02* (2013.01); *C08L 75/04* (2013.01); *C08L 77/02* (2013.01); *C09K 3/1021* (2013.01); *B32B 2307/536* (2013.01); *B32B 2605/00* (2013.01); *C08L 2203/30* (2013.01); *C09K 2200/065* (2013.01); *C09K 2200/0655* (2013.01); *C09K 2200/0667* (2013.01)

(58) Field of Classification Search
    CPC ....... B32B 2605/00; B60R 1/04; C08L 67/02; C08L 75/04; C08L 77/02; C08L 2203/30; C09K 3/1021; C09K 2200/065; C09K 2200/0655; C09K 2200/0667
    See application file for complete search history.

(56) References Cited

U.S. PATENT DOCUMENTS

| | | |
|---|---|---|
| 7,104,149 B2 | 9/2006 | Kurfiss et al. |
| 7,989,725 B2 * | 8/2011 | Boddie ............... H03K 17/962 200/600 |
| 8,179,437 B2 | 5/2012 | Schofield et al. |
| 8,256,821 B2 | 9/2012 | Lawlor et al. |
| 8,749,633 B2 | 6/2014 | Schofield et al. |
| 9,596,387 B2 | 3/2017 | Achenbach et al. |
| 9,604,576 B2 | 3/2017 | Uken et al. |
| 10,029,623 B2 | 7/2018 | Rawlings et al. |
| 10,479,289 B2 | 11/2019 | Jefferson et al. |
| 11,279,108 B2 * | 3/2022 | Bard ............... B32B 17/10348 |
| 11,351,931 B2 | 6/2022 | Mutyala et al. |
| 11,390,223 B2 | 7/2022 | Achenbach et al. |
| 11,780,379 B2 | 10/2023 | Blanche et al. |
| 2007/0216768 A1 | 9/2007 | Smith et al. |
| 2011/0233248 A1 | 9/2011 | Flemming et al. |
| 2019/0375344 A1 | 12/2019 | Kobayashi |
| 2021/0293933 A1 | 9/2021 | Schmidt et al. |
| 2021/0370845 A1 | 12/2021 | Asang |

OTHER PUBLICATIONS

ASTM International, "ASTM D790-17, Standard Test Methods for Flexural Properties of Unreinforced Plastics and Electrical Insulating Materials", 2017, 12 pages.

ASTM International, "ASTM 2240-15 (Reapproved 2021), Standard Test Method for Rubber Property-Durometer Hardness", 2021, 13 pages.

Machine-assisted English language abstract and machine-assisted English language translation for DE 10 2006 059 554 A1 extracted from espacenet.com database on Feb. 5, 2024, 8 pages.

Machine-assisted English language abstract and machine-assisted English language translation for DE 10 2019 134 006 A1 extracted from espacenet.com database on Feb. 5, 2024, 13 pages.

English language abstract for WO 2019/081315 A1 extracted from espacenet.com database on Sep. 3, 2024, 2 pages.

* cited by examiner

MOUNTING SYSTEM, A WINDOW ASSEMBLY INCLUDING THE SAME, AND A METHOD OF FORMING THE WINDOW ASSEMBLY

CROSS-REFERENCE TO RELATED APPLICATIONS

This application claims priority to U.S. Provisional Patent Application No. 63/443,580 filed Feb. 6, 2023, which is incorporated herein by reference in its entirety.

BACKGROUND OF THE DISCLOSURE

1. Field of the Disclosure

This invention relates generally to a mounting system, a window assembly including the same, and a method of forming a window assembly for a vehicle.

2. Description of the Related Art

Conventional components for vehicles (such as sensors) are mounted to various mounting surfaces of the vehicle, such as the windshield, the pillars, and the like. Such components can be sensitive to outside elements, such as water, dirt, and other debris. Furthermore, the mounting of these components relative to the mounting surface of the windshield can lead to undesirable noise, vibration, and harshness (NVH). To this end, there remains a need for improved mounting systems for housing components such as a sensor relative to a mounting surface of a vehicle.

SUMMARY

One general aspect of the present disclosure includes a mounting system configured to support a component relative to a mounting surface of a vehicle. The mounting system includes a mounting bracket including a mounting portion configured to be coupled to the mounting surface of the vehicle. The mounting bracket defining a component receptacle configured to support the component. The mounting bracket comprises a first plastic material. The first plastic material comprises a thermoplastic semi-crystalline polymer having at least one of an elastic modulus of 1000 MPa or greater and a Shore D hardness of 70 or greater. The mounting system also includes a seal coupled to the mounting bracket and configured to engage the mounting surface of the vehicle to inhibit ingress of debris between the mounting portion and the mounting surface of the vehicle. The seal comprises a second plastic material, different than the first plastic material. The second plastic material comprises a thermoplastic elastomer having at least one of an elastic modulus of 50 MPa or less and a Shore A hardness of 80 or less. The mounting bracket is formed from a first injection molding operation, and the seal is formed from a second injection molding operation, subsequent to first injection molding operation, such that the seal is overmolded to the mounting bracket.

Another general aspect of the present disclosure includes a window assembly configured to house a sensor. The window assembly includes a transparent pane including an inner surface and an opposing outer surface. The window assembly also includes a mounting bracket including a mounting portion coupled to the inner surface of the transparent pane. The mounting portion defines a total mounting area bounded by a perimeter of the mounting portion. The mounting bracket also defines a sensor aperture within the perimeter of the mounting portion. The mounting bracket comprises a first plastic material having at least one of an elastic modulus of 1000 MPa or greater and a Shore D hardness of 70 or greater. The mounting bracket is configured to support the sensor such that the sensor is aligned with the sensor aperture. The window assembly also includes a seal coupled to the mounting bracket along the perimeter of the mounting portion and engaging the inner surface of the transparent pane to inhibit ingress of debris between the mounting portion and the inner surface of the transparent pane. The seal comprises a second plastic material, different than the first plastic material. The second plastic material has at least one of an elastic modulus of 50 MPa or less and a Shore A hardness of 80 or less.

A further general aspect of the present disclosure includes a method of forming a window assembly configured to house one or more sensors. The method includes providing a transparent pane having an inner surface and an opposing outer surface. The method also includes forming a mounting bracket having a mounting portion defining a total mounting area bounded by a perimeter of the mounting portion, and defining a sensor aperture within the perimeter of the mounting portion. The mounting bracket comprises a first plastic material having at least one of an elastic modulus of 1000 MPa or greater and a Shore D hardness of 70 or greater. The mounting bracket is configured to support the sensor such that the sensor is aligned with the sensor aperture. The method also includes coupling a seal to the mounting bracket along the perimeter of the mounting portion. The seal comprises a second plastic material, different than the first plastic material. The second plastic material has at least one of an elastic modulus of 50 MPa or less and a Shore A hardness of 80 or less. The method also includes coupling the mounting bracket to the inner surface of the transparent pane such that the seal engages the inner surface of the transparent pane to inhibit ingress of debris between the mounting portion and the inner surface of the transparent pane.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
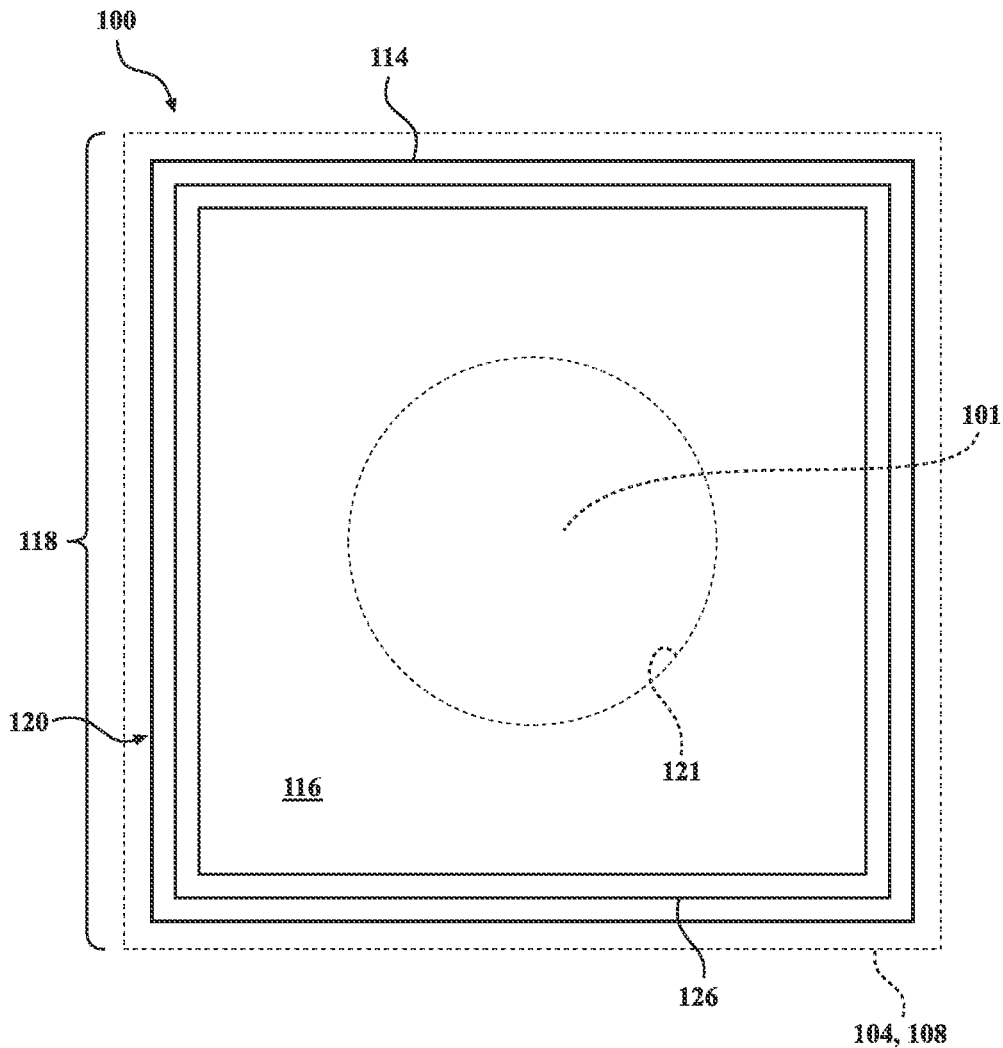
FIG. 1 is a front schematic representation of a mounting system according to the present disclosure.

With reference to the Figures, wherein like numerals indicate like parts throughout the several views, various configurations of mounting systems 100, 200, 300 according to the present disclosure are generally shown. The mounting systems 100, 200, 300 according to the present disclosure are configured to support a component 101 relative to a mounting surface 104 of a vehicle 108. The component 101 may be a sensor (such as a camera), a display panel, other vehicle components (such as interior panels, roof panels, body panels, etc.), and like, or combinations thereof. As described in further detail below, the mounting system 100 may be configured to support more than one component 101 relative to the mounting surface 104.

Figure 2A:
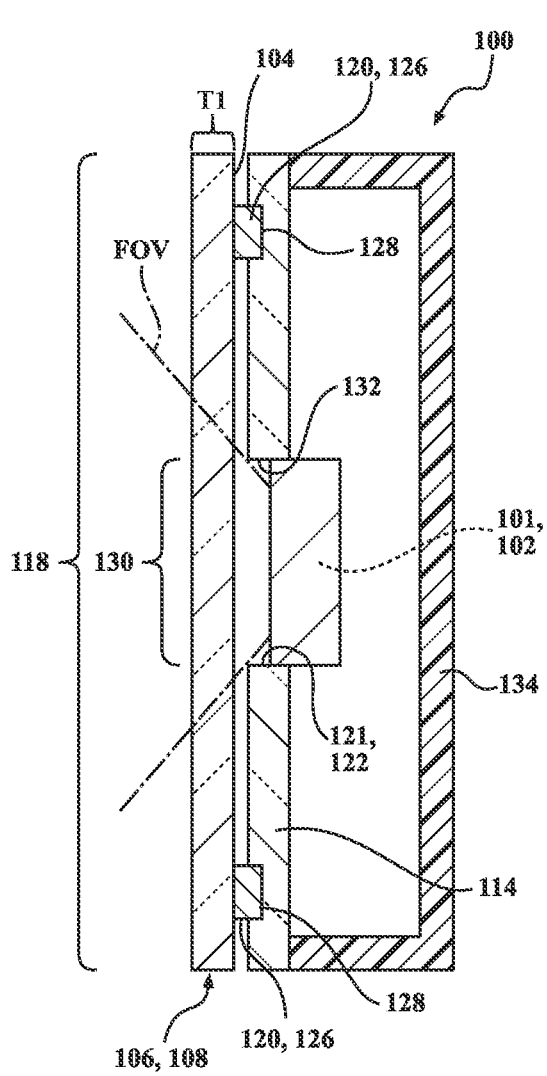
FIG. 2A is a cross-sectional representation of one example of a mounting system according to the present disclosure.
Figure 2B:
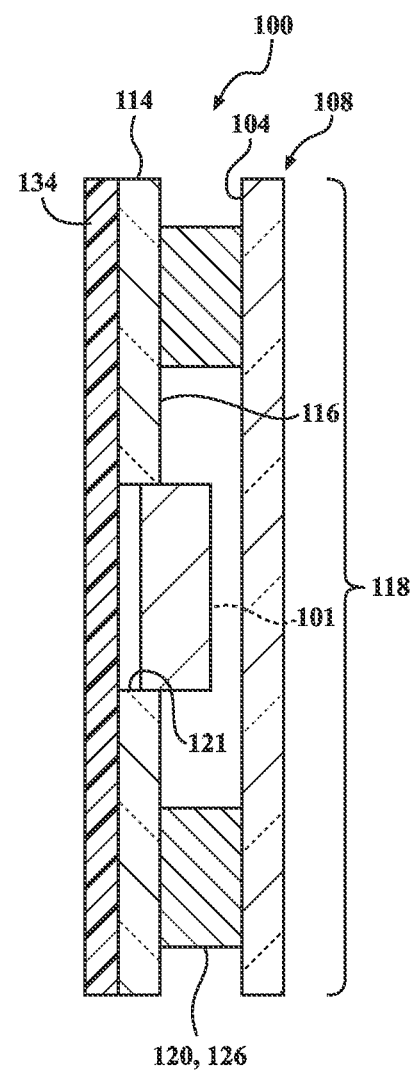
FIG. 2B is a cross-sectional representation of another example of a mounting system according to the present disclosure.

Referring to FIGS. 1-2B, a mounting system 100 according to the present disclosure includes a mounting bracket 114. The mounting bracket 114 is comprised of a first plastic material. In these embodiments, the first plastic material comprises a thermoplastic semi-crystalline polymer. Furthermore, the first plastic material according to these embodiments has at least one of an elastic modulus of 1000 MPa or greater and a Shore D hardness of 70 or greater. In other words, the first plastic material can have only an elastic modulus of 1000 MPa or greater, only a Shore D hardness of 70 or greater, or both an elastic modulus of 1000 MPa or greater and a Shore D hardness of 70 or greater.

In some examples, the first plastic material has an elastic modulus of between 1000 MPa and 10,000 MPa. For example, the elastic modulus of the first plastic material may be between 1000 MPa and 2000 MPa, between 2000 MPa and 3000 MPa, between 3000 MPa and 4000 MPa, between 4000 MPa and 5000 MPa, between 5000 MPa and 6000 MPa, between 6000 MPa and 7000 MPa, between 7000 MPa and 8000 MPa, between 8000 MPa and 9000 MPa, and between 9000 MPa and 10,000 MPa. In examples where the first plastic material is reinforced with additional materials (discussed below), the resulting elastic modulus may be significantly higher (e.g. as high as 200,000 MPa). One suitable technique for measuring modulus is provided in ASTM D638 (2022), which is entitled "Standard Test Method for Tensile Properties of Plastics" and is incorporated by reference in its entirety. Another suitable technique for measuring modulus is provided in ASTM D790 (2017), which is entitled "Standard Test Methods for Flexural Properties of Unreinforced and Reinforced Plastics and Electrical Insulating Materials" and is incorporated by reference in its entirety.

In some examples, the first plastic material has a Shore D hardness of between 70 and 100. For example, the Shore D hardness of the first plastic material may be between 70 and 75, between 75 and 80, between 80 and 85, between 85 and 90, between 90 and 95, and between 95 and 100. One suitable technique for measuring Shore A/D hardness is provided in ASTM D2240 (2021), which is entitled "Standard Test Method for Rubber Property-Durometer Hardness" and is incorporated by reference in its entirety.

In some examples, the first plastic material is selected from the group consisting of polybutylene terephthalate and polycaprolactam (i.e., PA6 nylon), but other materials are contemplated. Also, it should be appreciated that in some examples the first plastic material may be reinforced with additional materials such as carbon fiber or fiberglass.

The size and shape of the mounting bracket 114 is not particularly limited for the purposes of this disclosure. Accordingly, the mounting bracket is illustrated schematically in FIGS. 1-2B. The mounting bracket 114 has a mounting portion 116 that is configured to be coupled to the mounting surface 104 of the vehicle 108 (e.g. via an adhesive). It should be appreciated that the mounting portion 116 may be coupled to the mounting surface 104 of the vehicle 108 either directly or indirectly (e.g. with an intermediate component between the mounting portion 116 and the mounting surface 104). The mounting portion 116 may define a total mounting area 118 bounded by a perimeter 120 of the mounting portion 116.

Still referring to FIGS. 1-2B, the mounting portion 116 defines one or more component receptacles 121 which may be arranged within the perimeter 120 of the mounting portion 116. The mounting bracket 114 is configured to support the component(s) 101 such that the component(s) 101 are configured to be at least partially disposed in a respective component receptacle 121. The component(s) 101 are typically removably coupled to the mounting bracket 114. For example, the component(s) 101 may be fastened to the mounting bracket 114 (e.g. via screws, clips, or the like), or the component(s) 101 may be disposed in the component receptacle 121 via interference fit. Other configurations of coupling the component(s) 101 to the mounting bracket 114 are contemplated.

In one example, such as shown in FIG. 2A, the mounting surface 104 is a transparent pane 106 of a vehicle 108. Here, the mounting system 100 is configured to support the component 101 relative to the transparent pane 106 of the vehicle 108. Particularly, the mounting bracket 114 is configured to be coupled to the mounting surface 104 defined by the transparent pane 106 to support the component 101. In the illustrated example, the component 101 is a sensor 102 (described below). Here, the mounting bracket 114 supports the sensor 102 such that the field of view FOV of the sensor 102 faces the transparent pane 106 (and, thus, the sensor 102 looks through the transparent pane 106). In this example, the component receptacle 121 is further defined as a sensor aperture 122 which extends through the mounting bracket 114 and defines define a sensor area 130 bounded by a sensor aperture perimeter 132, with the sensor area 130 being less than the total mounting area 118 of the mounting portion 116. In some examples, the sensor aperture(s) 122 are spaced from the perimeter 120 of the mounting portion 116 (i.e., a portion of the total mounting area 118 is disposed between the sensor aperture 122 and the perimeter 120 of the mounting portion 116). In the example of FIG. 2B, the mounting surface 104 may be a sheet metal surface of the vehicle 108. Here, the mounting bracket 114 is configured to be coupled to the mounting surface 104 defined by the transparent pane 106 to support the component 101 relative to the mounting surface 104.

In configurations where the mounting system 100 is configured to support more than one component 101, the mounting bracket 114 defines a plurality of component receptacles 121 configured to support respective components 101. It is to be appreciated that the mounting system 100 may be configured to support any number of components 101, such as two, three, four, five, six, or more components 101. In some examples, a single component receptacle 121 may be configured to support a plurality of components 101.

As best shown in FIGS. 2A and 2B, the mounting system 100 also includes a seal 126. The seal 126 is comprised of a second plastic material, different than the first plastic material of the mounting bracket 114. In these embodiments, the second plastic material comprises a thermoplastic elastomer. In some examples, the thermoplastic elastomer is further defined as thermoplastic urethane, but other materials are contemplated. Furthermore, the second plastic material according to these embodiments has at least one of an elastic modulus of 50 MPa or less and a Shore A hardness of 80 or less. In other words, the second plastic material can have only an elastic modulus of 50 MPa or less, only a Shore A hardness of 80 or less, or both an elastic modulus of 50 MPa or less and Shore A hardness of 80 or less. In some examples, the second plastic material has an elastic modulus of between greater than 0 MPa and 50 MPa or less. For example, the elastic modulus of the second plastic material may be between greater than 0 MPa and 50 MPa, between greater than 0 MPa and 40 MPa, between greater than 0 MPa and 30 MPa, between greater than 0 MPa and 20 MPa, between greater than 0 MPa and 10 MPa, and between greater than 0 MPa and 5 MPa. In some examples, the second plastic material has a Shore A hardness of between 0 and 80. For example, the Shore A hardness of the second plastic material may be between 0 and 80, between 0 and 70, between 0 and 60, between 0 and 50, between 0 and 40, between 0 and 30, between 0 and 20, and between 0 and 10.

As best shown in FIGS. 2A and 2B, the seal 126 is coupled to the mounting bracket 114. Here, the seal 126 extends away from the mounting portion 116 such that the seal 126 is configured to engage the mounting surface 104 to inhibit ingress of debris, dust, moisture, and the like in the space between the mounting surface 104 and the mounting bracket 114 (e.g. the total mounting area 118 of the mounting portion 116). The seal 126 extends along the perimeter 120 of the mounting portion 116 of the mounting bracket 114 (best shown in FIG. 1). It should be appreciated that in some embodiments, such as shown in FIG. 1, the seal 126 extends along the entire perimeter 120 of the mounting portion 116 of the mounting bracket 114. However, in other embodiments, the seal 126 may extend partially along the perimeter 120 (e.g. one side) of the mounting portion 116 of the mounting bracket 114. In addition to inhibiting ingress of debris, dust, moisture, and the like in the space between the mounting surface 104 and the mounting bracket 114, having the seal 126 configured to engage the mounting surface 104 also reduces vibrations between the mounting bracket 114 and the mounting surface 104 and also reduces noise, vibration, and harshness (NVH) that may arise between the mounting bracket 114 to the mounting surface 104 of the vehicle 108.

A variety of approaches for coupling the seal 126 to the mounting bracket 114 are contemplated. For example, the seal 126 may be overmolded over the mounting bracket 114. The mounting bracket 114 and the seal 126 may be formed through two shot injection molding. Specifically, the mounting bracket 114 may be injection molded with the first plastic material and then the seal 126 including the second plastic material may be injection molded over the mounting bracket 114. In other words, the mounting bracket 114 may be formed from a first injection molding operation, and the seal 126 may be formed from a second injection molding operation, subsequent to the first injection molding operation, such that the seal 126 is overmolded to the mounting bracket 114. In these examples, it is important to select the first plastic material and the second plastic material to be compatible for an overmolding process. In some examples, such as shown in FIG. 2A, the mounting bracket 114 defines a bracket channel 128. In some examples, the seal 126 is at least partially disposed in the bracket channel 128. For example, the seal 126 may be overmolded into the bracket channel 128 or press-fit into the bracket channel 128 to couple the seal 126 to the mounting bracket 114. Other configurations of coupling the seal 126 to the mounting bracket 114 are contemplated.

Referring to FIGS. 2A and 2B, the mounting system 100 may further include a cover 134 coupled to the mounting bracket 114. Although not required, the cover 134 may conceal the component 101. The cover 134 may be fastened to the mounting bracket 114 (e.g. via screws, clips, or the like), or the cover 134 may be coupled to the mounting bracket 114 via interference fit. Other configurations of coupling the cover 134 to the mounting bracket 114 are contemplated. When present, the cover 134, when coupled to the mounting bracket 114, extends away from the mounting surface 104. For example, referring to FIG. 2A, in configurations where the mounting bracket 114 is coupled to a transparent pane 106, the mounting bracket 114 is disposed between the transparent pane 106 and the cover 134. In another example, referring to FIG. 2B, the mounting bracket 114 may be disposed between the cover 134 and the mounting surface 104 of the vehicle 108, such as sheet metal. The cover 134 is typically referred to as a beauty cover or an applique.

Referring to FIGS. 3-11, a mounting system 200 according to the present disclosure is configured to house a sensor 202 relative to a mounting surface 204 (e.g. an inner surface 205 of a transparent pane 206 of a vehicle 108). In these examples, the mounting system 200 may also be referred to as "sensor mounting system 200". The sensor 202 may be a camera, rain sensor, light sensor, light detection and ranging (LIDAR) sensor, collision sensor, forward collision sensor, and like, or combinations thereof. As described in further detail below, the sensor mounting system 200 may have more than one sensor 202.

In examples where the mounting surface 204 of the vehicle 108 is an inner surface 205 of a transparent pane 206 of the vehicle 208, the sensor mounting system 200 and the transparent pane 206 collectively define the window assembly 212. In some examples, the transparent pane 206 is implemented as at least one pane of glass. Where the transparent pane 206 is implemented as glass, the transparent pane 206 is comprised of any suitable glass composition including, but not limited to, soda-lime glass, aluminosilicate glass, borosilicate glass, boro-aluminosilicate glass, and the like. Those skilled in the art realize that the transparent pane 206 may be formed from polymeric materials such as polymethyl methacrylate, polycarbonate, polyvinyl butyral, or the like.

The transparent pane 206 has a thickness T1. The thickness T1 of the transparent pane 206 may be from about 0.3 mm to about 4.1 mm. More specifically, the thickness T1 may be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm.

As used herein, the term "transparent", refers to a material that allows 70% or more of light transmission in a predefined visible light range to travel therethrough. Typically, the predefined visible light range is the segment of the electromagnetic spectrum that the human eye can view (i.e., visible light). Thus, the predefined visible light range typically refers to wavelengths of light from about 380 to about 780 nanometers. Where the sensor 202 is a LIDAR sensor, however, the transparent pane 206 may additionally or alternatively allow 70% or more of light transmission in a predefined visible light range corresponding to operative spectrum of the LIDAR sensor to travel therethrough. For example, the predefined visible light range corresponding to operative spectrum of the LIDAR sensor may be between 780 nanometers and 2000 nanometers. Other spectrums are contemplated.

Figure 5:
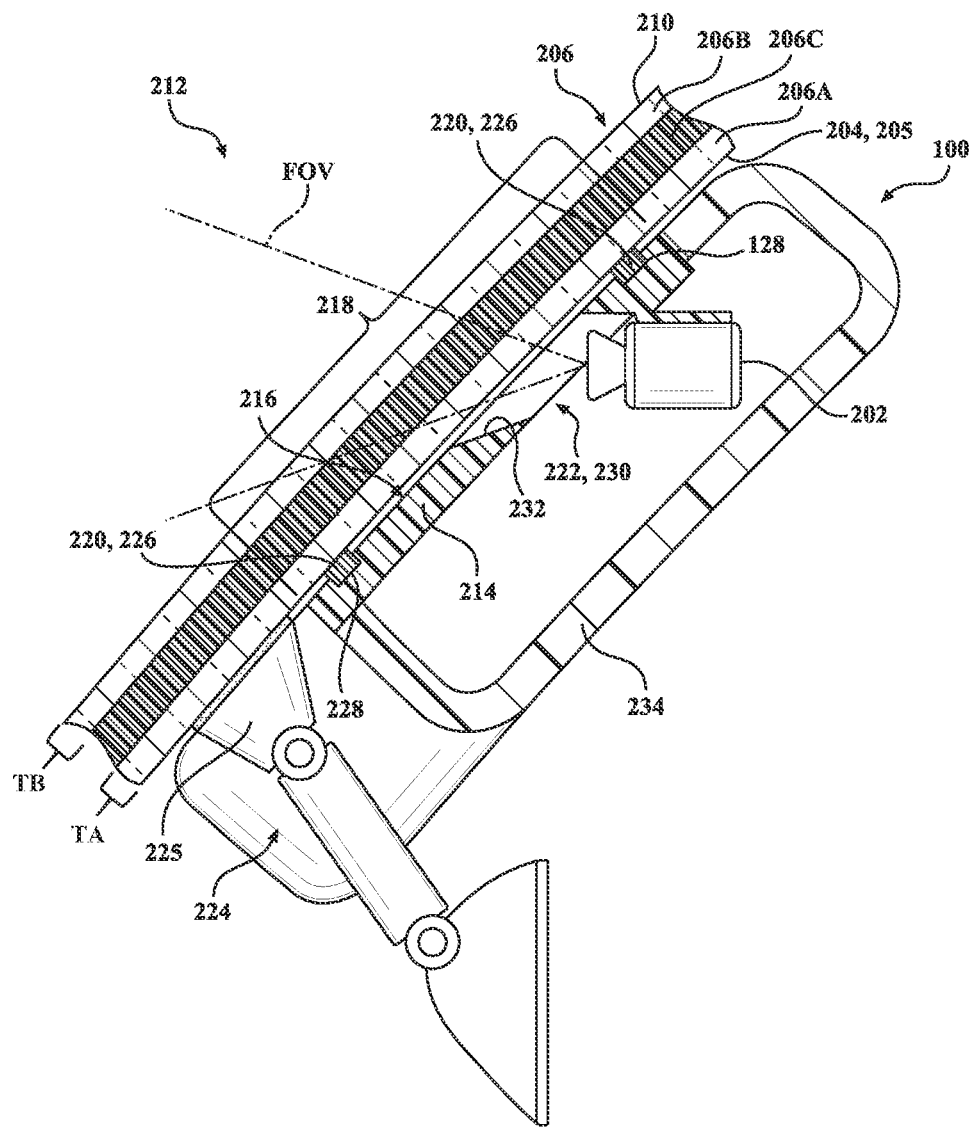
FIG. 5 is a schematic cross-sectional representation of the mounting system and window assembly of FIGS. 3 and 4 taken along line 5-5 of FIG. 4.
Figure 6:
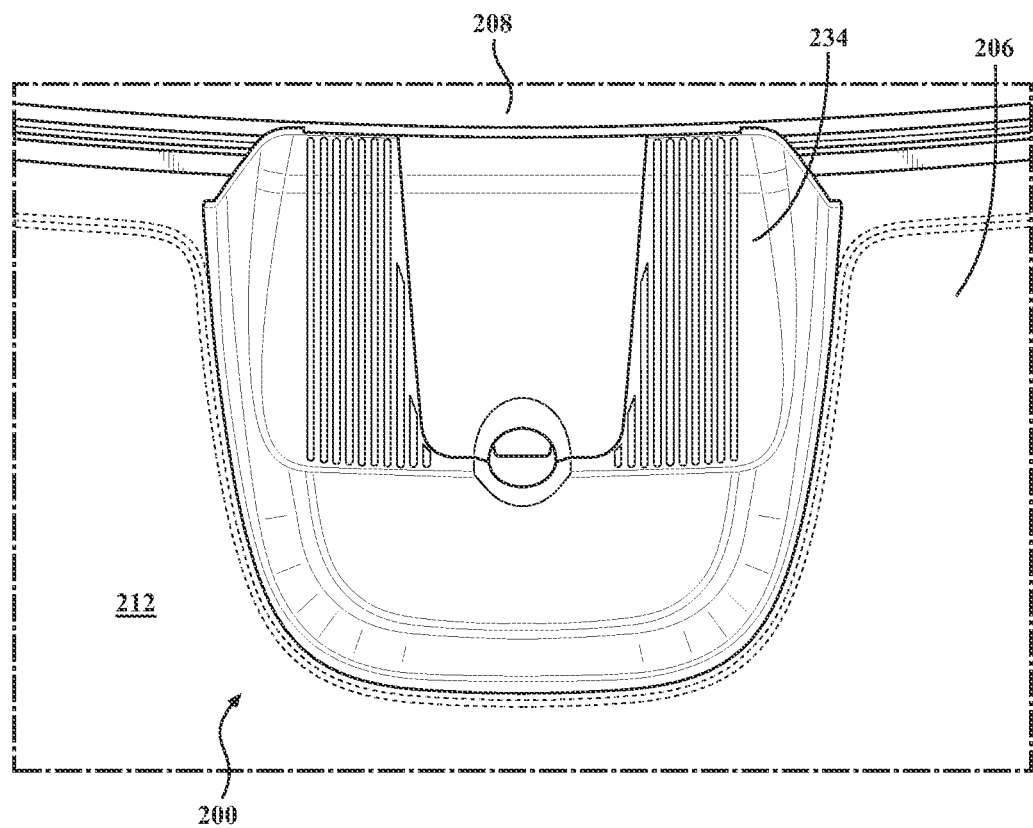
FIG. 6 is a close-up view of the mounting system of FIGS. 3 and 4, with the mounting system further including a cover.
Figure 7:
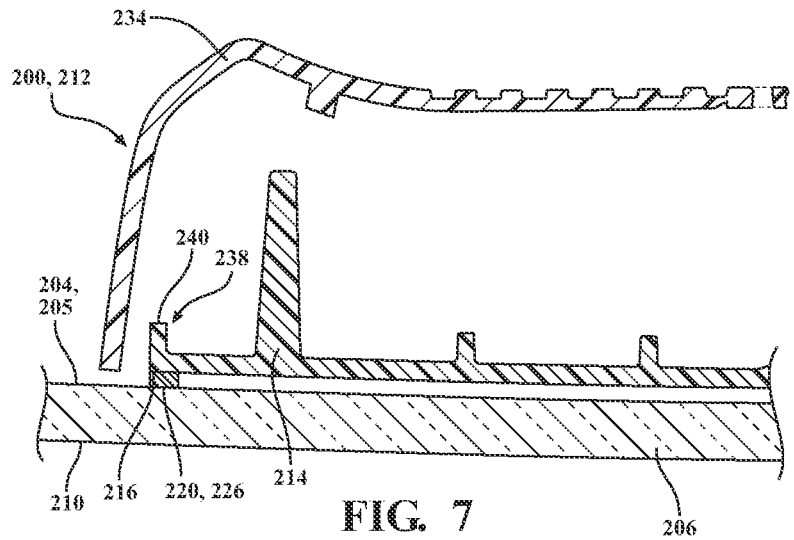
FIG. 7 is a cross-sectional representation of the mounting system of FIG. 6.
Figure 8:
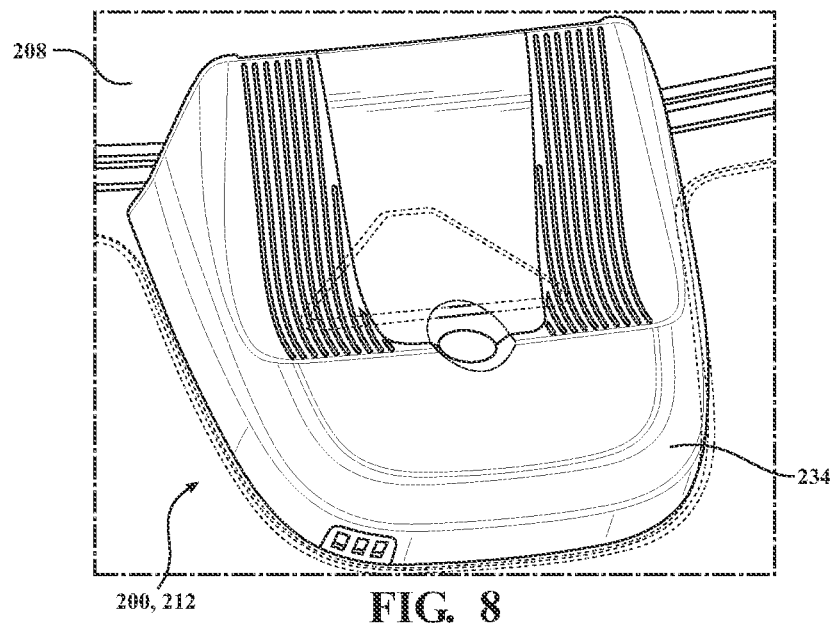
FIG. 8 is a perspective view of the mounting system of FIG. 6 and the window assembly.
Figure 9:
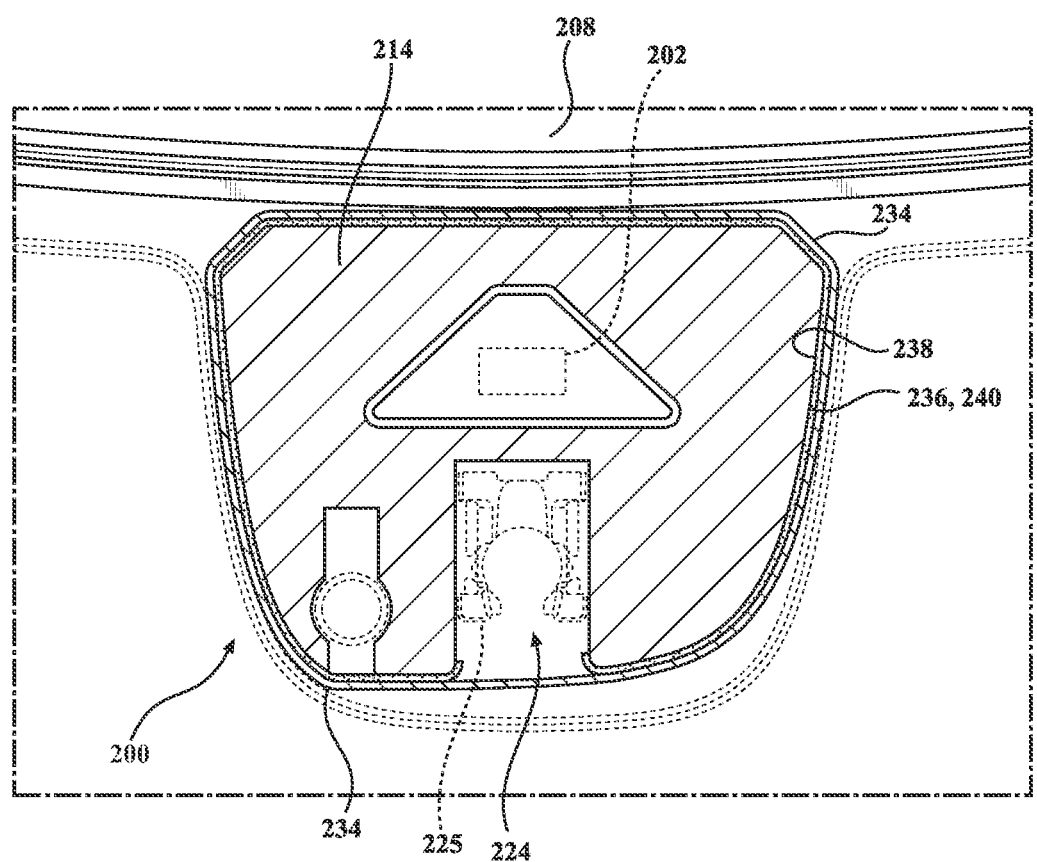
FIG. 9 is a cross-sectional representation of the mounting system of FIG. 6, with the mounting system including a second seal interposed between the mounting bracket and the cover.

In some examples, such as best shown in FIG. 5, the transparent pane 206 is formed as a laminated glazing, such as a windshield. In these examples, the laminated transparent pane 206 includes an inner glass substrate 206A defining the inner surface 205, an outer glass substrate 206B defining an outer surface 210, and a polymeric interlayer 206C disposed between the inner glass substrate 206A and the outer glass substrate 206B. The inner glass substrate 206A and the outer glass substrate 206B may be comprised of any suitable glass composition including, but not limited to, soda-lime glass, aluminosilicate glass, borosilicate glass, boro-aluminosilicate glass, and the like. It should be appreciated that the inner glass substrate 206A and the outer glass substrate 206B may be comprised of the same or different glass compositions.

The inner glass substrate 206A may have a thickness TA, and the outer glass substrate 206B may have a thickness TB. The thicknesses TA, TB of the inner glass substrate 206A and the outer glass substrate 206B, respectively, may be any suitable thickness for the application. For example, the thicknesses TA, TB of the inner glass substrate 206A and the outer glass substrate 206B, respectively, may be from about 0.3 mm to about 4.1 mm. More specifically, the thicknesses TA, TB, may each be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm. It should be appreciated that the thickness TA and the thickness TB can be the same or different. In one example, the inner glass substrate 206A and the outer glass substrate 206B have the same thickness (i.e., where TA is equal to TB) such that the transparent pane 206 is considered a "symmetric" laminate. However, in another example, the inner glass substrate 206A and the outer glass substrate 206B have different thicknesses (i.e., where TA is not equal to TB) such that the transparent pane 206 is considered an "asymmetric" laminate. All combinations of the example TA and TB values listed above and all fractional values therebetween are contemplated.

The polymeric interlayer 206C bonds the inner glass substrate 206A and the outer glass substrate 206B such that the polymeric interlayer 206C retains the inner glass substrate 206A and/or the outer glass substrate 206B in the event of impact or breakage of the transparent pane 206. The polymeric interlayer 206C includes a polymer or thermoplastic resin, such as polyvinyl butyral (PVB), ethylene-vinyl acetate (EVA), thermoplastic polyurethane (TPU), and the like. Other suitable materials for implementing the polymeric interlayer 206C may be utilized that provide the requisite performance characteristics regarding optical haze, adhesion to glass, and structural rigidity. Similar to the inner glass substrate 206A and the outer glass substrate 206B, the polymeric interlayer 206C is also substantially transparent or otherwise transparent to light.

Figure 3:
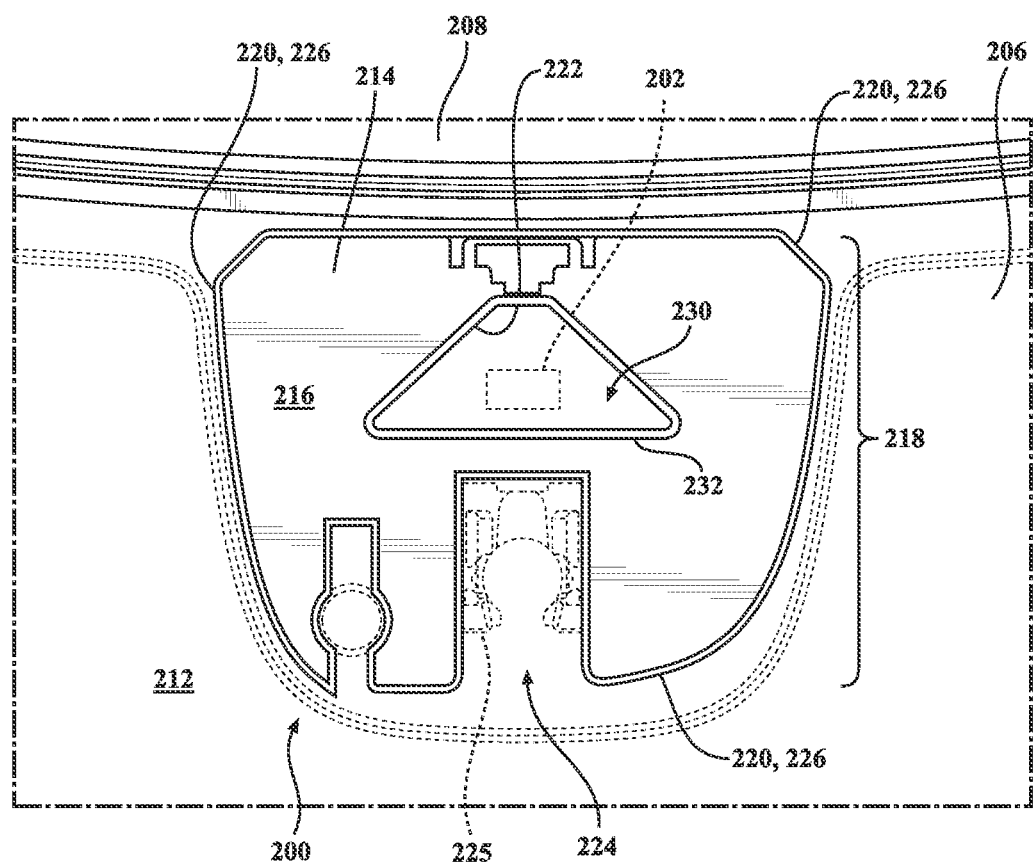
FIG. 3 is a front view of yet another example of a mounting system according to the present disclosure configured to be coupled to a window assembly of a vehicle, with the mounting system including a mounting bracket, and with the window assembly including a transparent pane.
Figure 4:
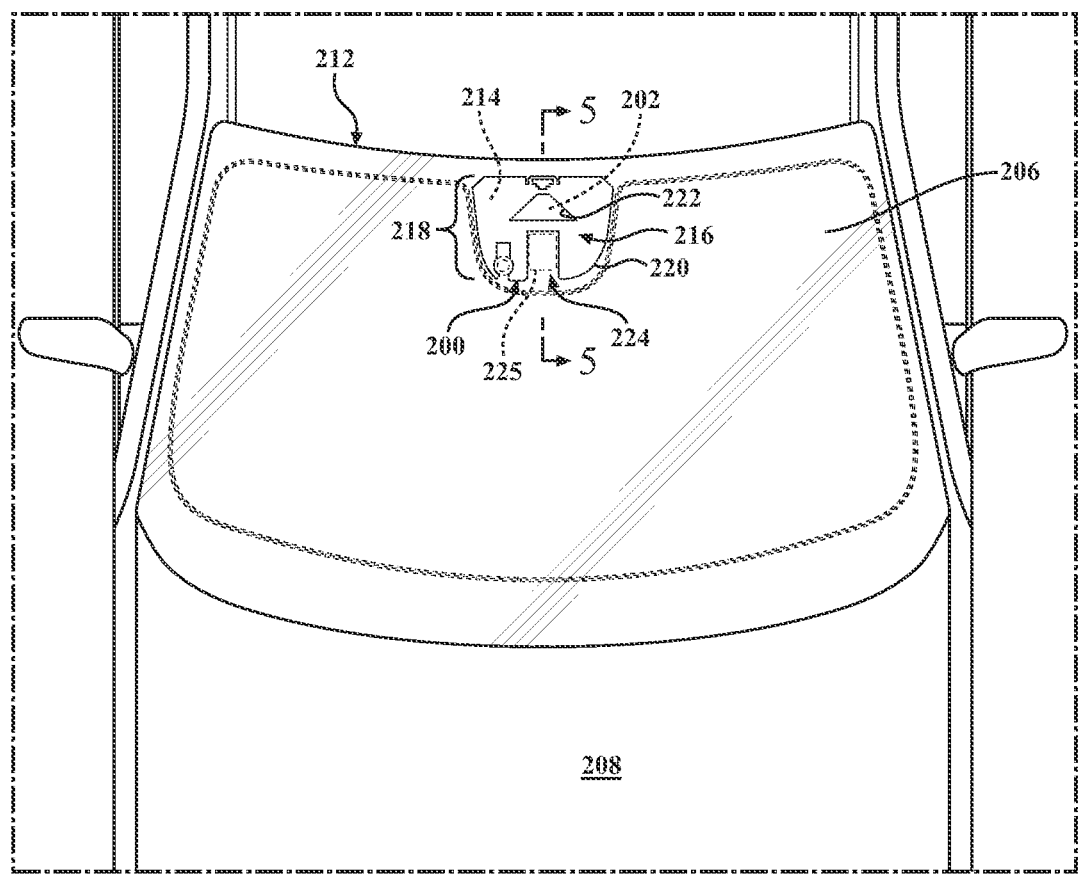
FIG. 4 is a top view of the mounting system of FIG. 3 shown installed in window assembly coupled to a vehicle.

Referring to FIGS. 3-5, the sensor mounting system 200 includes a mounting bracket 214. The mounting bracket 214 is comprised of a first plastic material. In these embodiments, the first plastic material may have an elastic modulus of 1000 MPa or greater. The first plastic material may additionally or alternatively have a Shore D hardness of 70 or greater. In some examples, the first plastic material is a thermoplastic semi-crystalline polymer, which may be selected from the group consisting of polybutylene terephthalate and polycaprolactam (i.e., PA6 nylon), but other materials are contemplated. The mounting bracket 214 has a mounting portion 216 that is configured to be coupled to the mounting surface 204 of the vehicle 108 (e.g. to the inner surface 205 of the transparent pane 206). It should be appreciated that the mounting portion 216 may be coupled to the mounting surface 204 of the vehicle 208 either directly or indirectly (e.g. with an intermediate component between the mounting portion 216 and the mounting surface 204). For example, the mounting portion 216 may be coupled to the mounting surface 204 directly with an adhesive, or, in other examples, an intermediate component may be coupled to the mounting surface 204 and the mounting portion 216 may be coupled to the intermediate component. The mounting portion 216 defines a total mounting area 218 bounded by a perimeter 220 of the mounting portion 216.

Still referring to FIGS. 3-5, the mounting portion 216 defines one or more sensor apertures 222 within the perimeter 220 of the mounting portion 216. The mounting bracket 214 is configured to support the sensor(s) 202 such that the sensor(s) 202 is (are) aligned with a respective sensor aperture 222. For example, as best shown in FIG. 5, in configurations where the sensor mounting system 200 is included in a window assembly 212, the mounting bracket supports the sensor 202 such that the field of view FOV of the sensor 202 faces the transparent pane 206 (and, thus, the sensor 202 looks through the transparent pane 206). The sensor(s) 202 is (are) typically removably coupled to the mounting bracket 214. For example, the sensor(s) 202 may be fastened to the mounting bracket 214 (e.g. via screws, clips, or the like), or the sensor(s) 202 may be disposed in the sensor aperture 222 via interference fit. Other configurations of coupling the sensor(s) 202 to the mounting bracket 214 are contemplated.

In some examples, the sensor aperture(s) 222 defines a sensor area 230 bounded by a sensor aperture perimeter 232, with the sensor area 230 being less than the total mounting area 218 of the mounting portion 216. In some examples, the sensor aperture(s) 222 is (are) spaced from the perimeter 220 of the mounting portion 216 (i.e., a portion of the total mounting area 218 is disposed between the sensor aperture 222 and the perimeter 220 of the mounting portion 216). It should be appreciated that in addition to the seal 226 described below, the sensor mounting system 200 may further include a sensor perimeter seal coupled to the mounting bracket 214 and comprised of the second plastic material (described below) and configured to engage the mounting surface 204 to inhibit debris, dust, moisture, and the like from entering the sensor aperture 222.

In configurations where the sensor mounting system 200 is configured to support more than one sensor 202, the mounting bracket 214 defines a plurality of sensor apertures 222 configured to support respective sensors 202 such that the sensors 202 are concealed within the confines of the seal 226 (described below). It is to be appreciated that the sensor mounting system 200 may be configured to support any number of sensors 202, such as two, three, four, five, six, or more sensors 202. For example, the mounting portion 216 may define a first sensor aperture housing a camera, a second sensor aperture for housing a rain sensor, a third aperture for housing a light sensor, and a fourth aperture for housing a LIDAR sensor. In some examples, a single sensor aperture 222 may be configured to support a plurality of sensors 202. Additionally, in configurations where the sensor mounting system 200 is included in a window assembly 212, the mounting portion 216 defines a notch 224 sized to receive a mirror button for securing a rearview mirror 225 to the transparent pane 206.

The sensor mounting system 200 also includes a seal 226. The seal 226 is comprised of a second plastic material, different than the first plastic material of the mounting bracket 214. In these embodiments, the second plastic material has an elastic modulus of 50 MPa or less. The second plastic material may additionally or alternatively have a Shore A hardness of 80 or less. In some examples, the second plastic material is a thermoplastic elastomer, which may be further defined as thermoplastic urethane, but other materials are contemplated.

As best shown in FIG. 5, the seal 226 is coupled to the mounting bracket 214. Here, the seal 226 extends away from the mounting portion 216 such that the seal 226 is configured to engage the mounting surface 204 (e.g. the inner surface 205 of the transparent pane 206) to inhibit ingress of debris, dust, moisture, and the like in the space between the mounting surface 204 and the mounting bracket 214 (e.g. the total mounting area 218 of the mounting portion 216). The seal 226 extends along the perimeter 220 of the mounting portion 216 of the mounting bracket 214 (best shown in FIG. 3). It should be appreciated that in some embodiments, such as shown in FIG. 3, the seal 226 extends along the entire perimeter 220 of the mounting portion 216 of the mounting bracket 214. However, in other embodiments, the seal 226 may extend partially along the perimeter 120 (e.g. one side) of the mounting portion 216 of the mounting bracket 214. Having the seal 226 extend along the perimeter 220 of the mounting portion 216 and configured to engage the mounting surface 204 inhibits debris, dust, moisture, and the like from not only entering the total mounting area 218, but also from entering the sensor aperture(s) 222. Additionally, having the seal 226 configured to engage the mounting surface 204 reduces vibrations between the mounting bracket 214 and the mounting surface 204 and also reduces noise, vibration, and harshness (NVH) that may arise between the mounting bracket 214 to the mounting surface 204 of the vehicle 208.

A variety of approaches for coupling the seal 226 to the mounting bracket 214 are contemplated. For example, the seal 226 may be overmolded over the mounting bracket 214. The mounting bracket 214 and the seal 226 may be formed through two shot injection molding. Specifically, the mounting bracket 214 may be injection molded with the first plastic material and then the seal 226 including the second plastic material may be injection molded over the mounting bracket 214. In other words, the mounting bracket 214 may be formed from a first injection molding operation, and the seal 226 may be formed from a second injection molding operation, subsequent to first injection molding operation, such that the seal 226 is overmolded to the mounting bracket 214. In these examples, it is important to select the first plastic material and the second plastic material to be compatible for an overmolding process. In some examples, such as shown in FIG. 5, the mounting bracket 214 defines a bracket channel 228. In some examples, the seal 226 is at least partially disposed in the bracket channel 228. For example, the seal 226 may overmolded into the bracket channel 228 or press-fit into the bracket channel 228 to couple the seal 226 to the mounting bracket 214. Other configurations of coupling the seal 226 to the mounting bracket 214 are contemplated.

Referring to FIGS. 5-11, the sensor mounting system 200 may further include a cover 234 coupled to the mounting bracket 214. Although not required, the cover 234 may conceal the sensor 202. The cover 234 may be fastened to the mounting bracket 214 (e.g. via screws, clips, or the like), or the cover 234 may be coupled to the mounting bracket 214 via interference fit. Other configurations of coupling the cover 234 to the mounting bracket 214 are contemplated. When present, the cover 234, when coupled to the mounting bracket 214, extends away from the mounting surface 204. For example, referring to FIG. 7, in configurations where the sensor mounting system 200 is included in a window assembly 212, the mounting bracket 214 is disposed between the inner surface 205 of the transparent pane 206 and the cover 234. The cover 234 is typically referred to as a beauty cover. As shown in the illustrated configurations, where the sensor mounting system 200 is included in a window assembly 212, the cover 234 may define a through-hole 235 for receiving supporting a rear view mirror 225.

Figure 10:
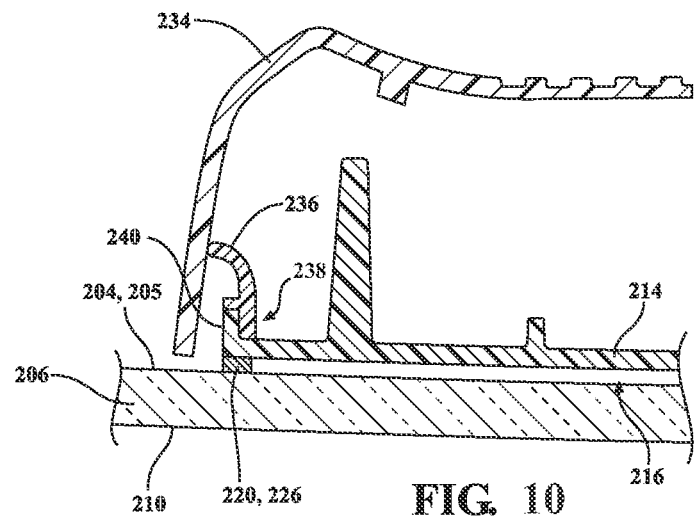
FIG. 10 is a bottom cross-sectional view of the mounting system of FIG. 9 illustrating the first seal and one configuration of the second seal.
Figure 11:
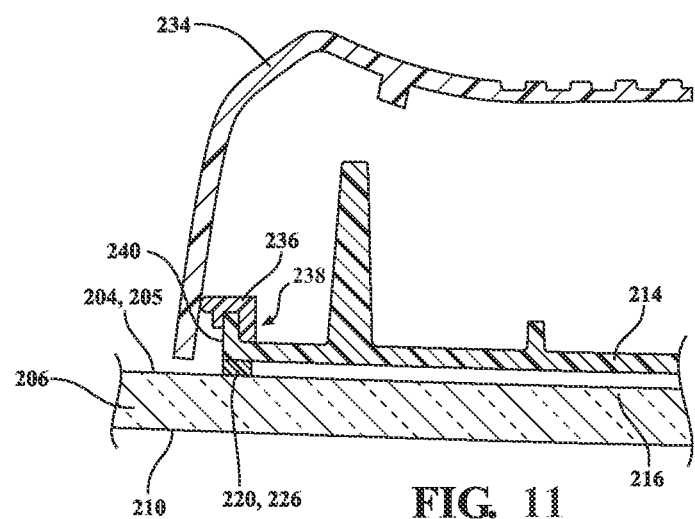
FIG. 11 is a bottom cross-sectional view of the mounting system of FIG. 9 illustrating the first seal and another configuration of the second seal.

In one embodiment, the seal 226 is further defined as a first seal 226, and the sensor mounting system 200 may include a second seal 236. The second seal 236 is interposed between the mounting bracket 214 and the cover 234, as shown in FIGS. 10 and 11. In other words, the second seal 236 is coupled to one of the mounting bracket 214 and the cover 234 and arranged to abut the other of the mounting bracket 214 and the cover 234 to inhibit debris, dust, moisture, and the like, from entering therebetween. The second seal 236, like the first seal 226, may be formed from the second plastic material. A variety of approaches for coupling the second seal 236 to one of the mounting bracket 214 and the cover 234 are contemplated. In some examples, referring to FIGS. 10 and 11, the mounting bracket 214 has a coupling portion 238 facing opposite the mounting portion 216, and the second seal 236 may disposed around a perimeter 240 of the coupling portion 238. In other examples, the second seal 236 is overmolded over one of the mounting bracket 214 and the cover 234.

Figures 12, 13:
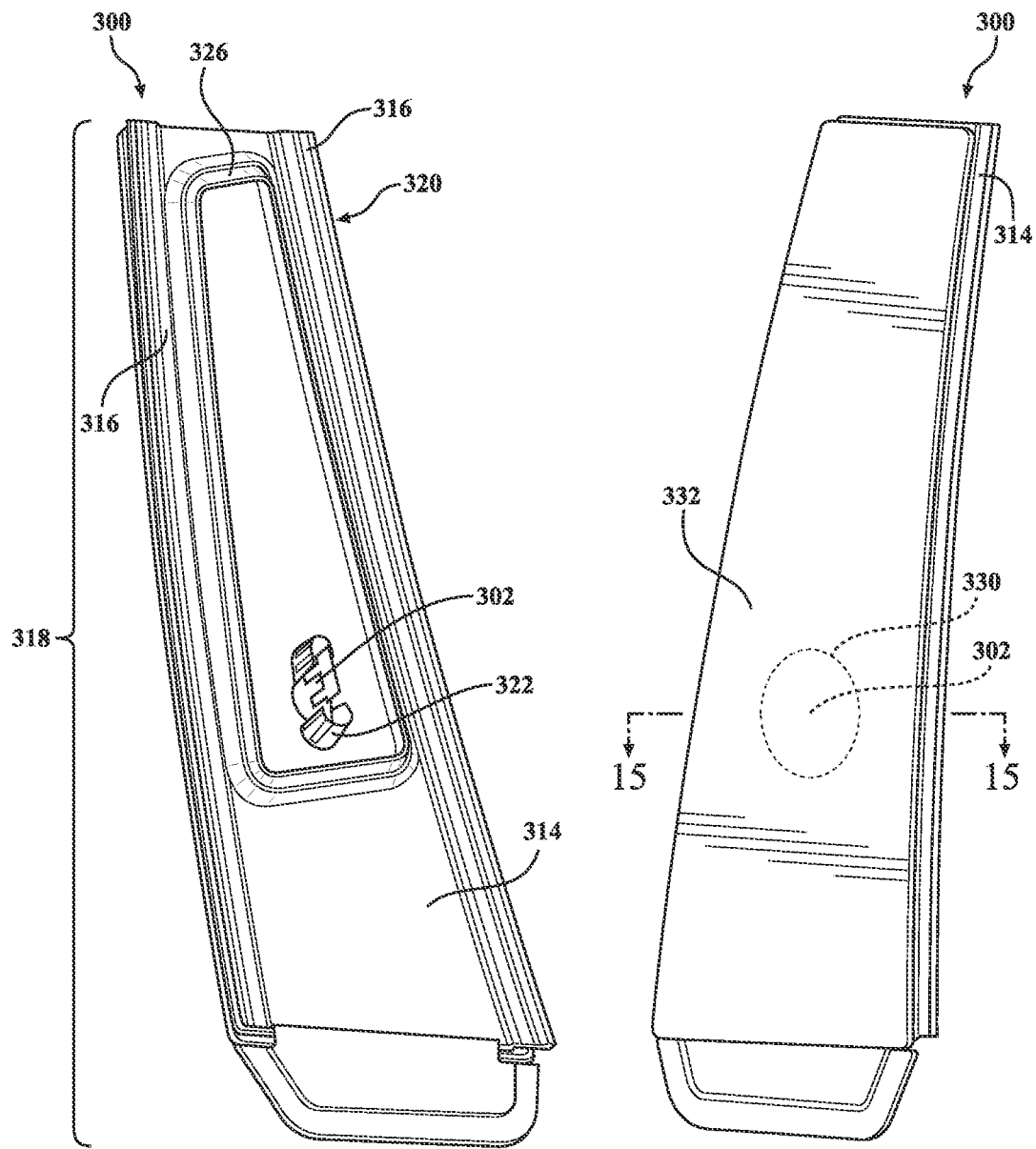
FIG. 12 is a perspective view of another mounting system according to the present disclosure.
FIG. 13 is a perspective view of the mounting system of FIG. 12, with the mounting system having a mounting bracket having a mounting portion, and with the mounting portion being configured to be coupled to an exterior cover.
Figure 14:
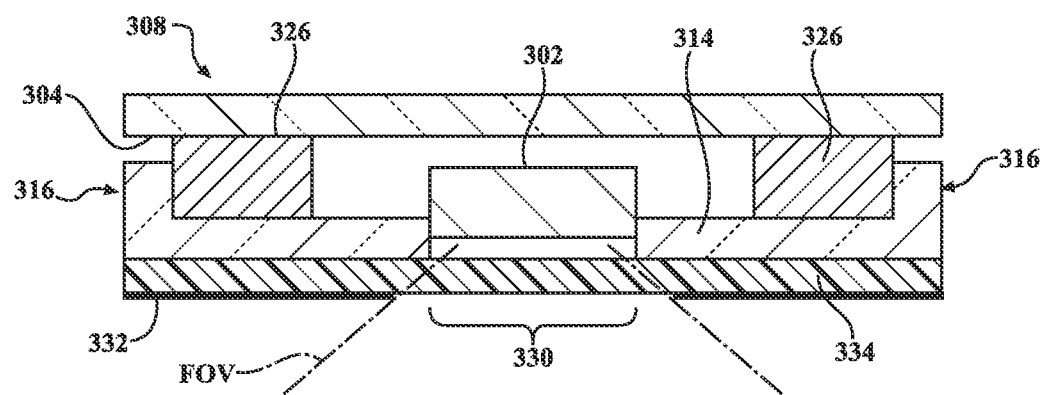
FIG. 14 is a cross-sectional representation of the mounting system of FIGS. 12 and 13, taken along line 15-15 of FIG. 13

In another embodiment, another mounting system 300 according to the present disclosure is generally shown in FIGS. 12-14. Similar to the sensor mounting system 200 described above in the context of FIGS. 5-11, the sensor mounting system 300 is configured to house a sensor 302 relative to a mounting surface 304 of a vehicle 308. Here, the mounting system 300 may also be referred to as "sensor mounting system 300". In these examples, the mounting surface 304 of the vehicle 308 includes, for example, a pillar of the vehicle 308, such as an A-Pillar, B-Pillar, or C-Pillar, or otherwise to the exterior of the vehicle. Similar to the sensor 202 described above in the context of FIGS. 5-11, the sensor 302 may be a camera, rain sensor, light sensor, light detection and ranging (LIDAR) sensor, collision sensor, forward collision sensor, and like, or combinations thereof, and the sensor mounting system 300 may have more than one sensor 302.

With continued reference to FIGS. 12-14, the sensor mounting system 300 includes a mounting bracket 314 comprised of the first plastic material (described above). The mounting bracket 314 has a mounting portion 316 that is configured to be coupled to the mounting surface 304 of the vehicle 308, such as sheet metal of the vehicle and/or to the material that is behind an A-Pillar, B-Pillar, C-Pillar, etc. The mounting portion 316 defines a total mounting area 318 bounded by a perimeter 320 of the mounting portion 316. Similar to as described above in the context of FIGS. 5-11, the mounting portion 316 defines one or more sensor apertures 322 within the perimeter 320 of the mounting portion 316. The mounting bracket 314 is configured to support the sensor(s) 302 such that the sensor(s) 302 are aligned with a respective sensor aperture 322. The sensor(s) 302 is (are) typically removably coupled to the mounting bracket 314. For example, the sensor(s) 302 may be fastened to the mounting bracket 314 (e.g. via screws, clips, or the like), or the sensor(s) 302 may be disposed in the sensor aperture 322 via interference fit. Other configurations of coupling the sensor(s) 302 to the mounting bracket 314 are contemplated.

The sensor mounting system 300 also includes a seal 326 comprised of the second plastic material (described above). Similar to as described above in the context of FIGS. 5-11, a variety of approaches for coupling the seal 326 to the mounting bracket 314 are contemplated. For example, similar to as described above in the context of FIGS. 5-11, the mounting bracket 314 may define a bracket channel (not shown) for receiving the seal 326.

In the present configurations, the seal 326 extends away from the mounting portion 316 such that the seal 326 is configured to engage the mounting surface 304 of the vehicle 308 (e.g. the sheet metal of the vehicle 308 and/or to the material that is behind an A-Pillar, B-Pillar, C-Pillar, etc.) to inhibit ingress of debris, dust, moisture, and the like in the space between the mounting surface 304 and the mounting bracket 314. Having the seal 326 configured to engage the mounting surface 304 of the vehicle 308 to inhibit ingress of debris between the mounting portion 316 and the mounting surface 304 of the vehicle 308 inhibits debris from not only entering the space between the mounting surface 304 and the mounting bracket 314, but also from entering the sensor aperture(s) 322.

With particular reference to FIGS. 13 and 14, similar to as described above in the context of FIGS. 5-11, the sensor mounting system 300 may also include an exterior cover 334. FIG. 13 shows the mounting bracket 314 rotated approximately 180 degrees from the view of FIG. 12. In other words, the mounting portion 316 shown in FIG. 12 is coupled to mounting surface 304 the vehicle 308, and the exterior cover 334 is facing the exterior of the vehicle 308 with the sensor 302 viewing the exterior of the vehicle 308 through the exterior cover 334 (illustrated schematically with reference numeral 330). In some examples, at least the portion 330 of the exterior cover 334 that is aligned with the field of view (FOV) of the sensor 302 may be transparent. In these examples, the exterior cover 334 may comprise glass or a transparent polymeric material, such as described above in the context of transparent pane 206. The exterior cover 334 may also include an opaque mask 332 disposed on portions of the exterior cover 334 that are not aligned with the field of view FOV of the sensor 302 to conceal any components beneath the exterior cover 334.

Figure 15:
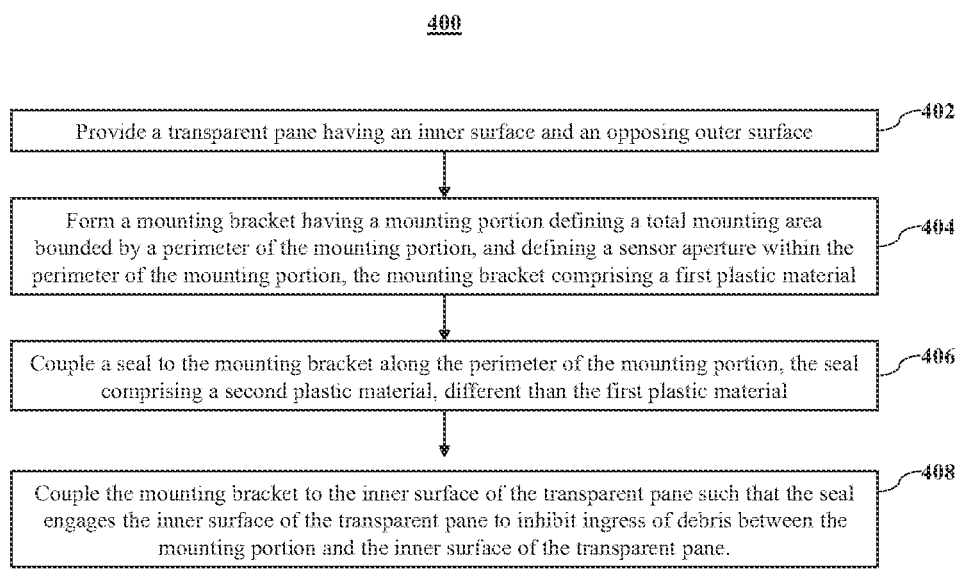
FIG. 15 is a flowchart illustrating a method of forming a mounting system according to the present disclosure.

The present disclosure is also directed to a method 400 of forming the window assembly 212 according to the present disclosure. Referring to FIG. 15, the method 400 includes a step 402 of providing a transparent pane 206 having an inner surface 205 and an opposing outer surface 210. The method 400 of forming the window assembly 212 also includes a step 404 of forming a mounting bracket 214 having a mounting portion 216 defining a total mounting area 218 bounded by a perimeter 220 of the mounting portion 216. The mounting portion 216 further defines a sensor aperture 222 within the perimeter 220 of the mounting portion 216. Similar to as described above, the mounting bracket 214 is comprised of a first plastic material having at least one of an elastic modulus of 1000 MPa or greater and a Shore D hardness of 80 or greater. The method 400 further includes a step 406 of coupling a seal 226 to the mounting bracket 214 along the perimeter 220 of the mounting portion 216. Similar to as described above, the seal 226 is comprised of a second plastic material, different than the first plastic material, and having at least one of an elastic modulus of 50 MPa or less and a Shore A hardness of 80 or less. In some examples, the step 406 may further include overmolding the seal 226 over the mounting bracket 214 along the perimeter 220 of the mounting portion 216. The method 400 additionally includes a step 408 of coupling the mounting bracket 214 to the inner surface 205 of the transparent pane 206 (e.g. via an adhesive, directly or indirectly) such that the seal 226 engages the inner surface 205 of the transparent pane 206 to inhibit ingress of debris between the mounting portion 216 and the inner surface of the transparent pane 206.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

The present disclosure also comprises the following clauses, with specific features laid out in dependent clauses, that may specifically be implemented as described in greater detail with reference to the configurations and drawings above.

CLAUSES

I. A window assembly configured to house a sensor, the window assembly comprising:
  a transparent pane including an inner surface and an opposing outer surface;
  a mounting bracket including a mounting portion coupled to the inner surface of the transparent pane, the mounting portion defining a total mounting area bounded by a perimeter of the mounting portion, and defining a sensor aperture within the perimeter of the mounting portion, wherein the mounting bracket comprises a first plastic material having at least one of an elastic modulus of 1000 MPa or greater and a Shore D hardness of 70 or greater, and wherein the mounting bracket is configured to support the sensor such that the sensor is aligned with the sensor aperture; and
  a seal coupled to the mounting bracket along the perimeter of the mounting portion and engaging the inner surface of the transparent pane to inhibit ingress of debris between the mounting portion and the inner surface of the transparent pane, wherein the seal comprises a second plastic material, different than the first plastic material, and having at least one of an elastic modulus of 50 MPa or less and a Shore A hardness of 80 or less.

II. The window assembly as set forth in clause I, wherein the mounting bracket defines a bracket channel, and wherein the seal is at least partially disposed in the bracket channel.

III. The window assembly as set forth in any one of clauses I or II further comprising a cover coupled to the mounting bracket for concealing the sensor.

IV. The window assembly as set forth in clause III, wherein the seal is further defined as a first seal, and wherein the window assembly further comprises a second seal interposed between the mounting bracket and the cover to inhibit ingress of debris therebetween.

V. The window assembly as set forth in clause IV, wherein the mounting bracket further includes a coupling portion facing opposite the mounting portion; and wherein the second seal is disposed around a perimeter of the coupling portion.

VI. The window assembly as set forth in any one of clauses I to V, wherein the mounting bracket defines a notch configured to receive a rearview mirror of a vehicle.

VII. The window assembly as set forth in any one of clauses I to VI, wherein the first plastic material is a thermoplastic semi-crystalline polymer.

VIII. The window assembly as set forth in any one of clauses I to VII, wherein the first plastic material is selected from the group consisting of polybutylene terephthalate and polycaprolactam.

IX. The window assembly as set forth in any one of clauses I to VIII, wherein the second plastic material is a thermoplastic elastomer.

X. The window assembly as set forth in clause IX, wherein the thermoplastic elastomer is a thermoplastic urethane.

XI. A method of forming a window assembly configured to house one or more sensors, the method comprising:
  providing a transparent pane having an inner surface and an opposing outer surface;
  forming a mounting bracket having a mounting portion defining a total mounting area bounded by a perimeter of the mounting portion, and defining a sensor aperture within the perimeter of the mounting portion, wherein the mounting bracket comprises a first plastic material having at least one of an elastic modulus of 1000 MPa or greater and a Shore D hardness of 70 or greater, and wherein the mounting bracket is configured to support the sensor such that the sensor is aligned with the sensor aperture;
  coupling a seal to the mounting bracket along the perimeter of the mounting portion, the seal comprising a second plastic material, different than the first plastic material, and having at least one of an elastic modulus of 50 MPa or less and a Shore A hardness of 80 or less; and coupling the mounting bracket to the inner surface of the transparent pane such that the seal engages the inner surface of the transparent pane to inhibit ingress of debris between the mounting portion and the inner surface of the transparent pane.

XII. The method according to clause XI, wherein the step of coupling the seal to the mounting bracket further comprises overmolding the seal over the mounting bracket along the perimeter of the mounting portion.

XIII. A mounting system configured to support a component relative to a mounting surface of a vehicle, the mounting system comprising:
  a mounting bracket including a mounting portion configured to be coupled to the mounting surface of the vehicle, the mounting bracket defining a component receptacle configured to support the component, wherein the mounting bracket comprises a first plastic material, and wherein the first plastic material comprises a thermoplastic semi-crystalline polymer having at least one of an elastic modulus of 1000 MPa or greater and a Shore D hardness of 70 or greater; and
  a seal coupled to the mounting bracket and configured to engage the mounting surface of the vehicle to inhibit ingress of debris between the mounting portion and the mounting surface of the vehicle, wherein the seal comprises a second plastic material, different than the first plastic material, and wherein the second plastic material comprises a thermoplastic elastomer having at least one of an elastic modulus of 50 MPa or less and a Shore A hardness of 80 or less;
  wherein the mounting bracket is formed from a first injection molding operation, and wherein the seal is formed from a second injection molding operation, subsequent to first injection molding operation, such that the seal is overmolded to the mounting bracket.

XIV. The mounting system as set forth in clause XIII, wherein the mounting bracket defines a bracket channel, and wherein the seal is at least partially disposed in the bracket channel.

XV. The mounting system as set forth in any one of clauses XIII or XIV further comprising a cover coupled to the mounting bracket for at least partially concealing the mounting bracket.

XVI. The mounting system as set forth in clause XV, wherein the seal is further defined as a first seal, and wherein the window assembly further comprises a second seal interposed between the mounting bracket and the cover to inhibit ingress of debris therebetween.

XVII. The mounting system as set forth in any one of clauses XIII to XVI, wherein the first plastic material is a thermoplastic semi-crystalline polymer.

XVIII. The mounting system as set forth in any one of clauses XIII to XVII, wherein the first plastic material is selected from the group consisting of polybutylene terephthalate and polycaprolactam.

XIX. The mounting system as set forth in any one of clauses XIII to XVIII, wherein the second plastic material is a thermoplastic elastomer.

XX. The mounting system as set forth in clause XIX, wherein the thermoplastic elastomer is a thermoplastic urethane.

XXI. The mounting system as set forth in any one of clauses XIII to XX, wherein the component is further defined as a sensor, and the component receptacle is further defined as a sensor aperture extending through the mounting bracket; and wherein the mounting bracket is configured to support the sensor such that the sensor is aligned with the sensor aperture.

XXII. A window assembly comprising:
the mounting system as set forth in clause XXI; and
a transparent pane including an inner surface and an opposing outer surface, wherein the inner surface defines the mounting surface of the vehicle;
wherein the seal engages the inner surface of the transparent pane to inhibit ingress of debris between the mounting portion and the inner surface of the transparent pane.

What is claimed is:

1. A window assembly configured to house a sensor, the window assembly comprising:
a transparent pane including an inner surface and an opposing outer surface;
a mounting bracket including a mounting portion coupled to the inner surface of the transparent pane, the mounting portion defining a total mounting area bounded by a perimeter of the mounting portion, and defining a sensor aperture within the perimeter of the mounting portion, wherein the mounting bracket comprises a first plastic material having at least one of an elastic modulus of 1000 MPa or greater and a Shore D hardness of 70 or greater, and wherein the mounting bracket is configured to support the sensor such that the sensor is aligned with the sensor aperture; and
a seal coupled to the mounting bracket along the perimeter of the mounting portion and engaging the inner surface of the transparent pane to inhibit ingress of debris between the mounting portion and the inner surface of the transparent pane, wherein the seal comprises a second plastic material, different than the first plastic material, and having at least one of an elastic modulus of 50 MPa or less and a Shore A hardness of 80 or less.

2. The window assembly as set forth in claim 1, wherein the mounting bracket defines a bracket channel, and wherein the seal is at least partially disposed in the bracket channel.

3. The window assembly as set forth in claim 1 further comprising a cover coupled to the mounting bracket for concealing the sensor.

4. The window assembly as set forth in claim 3, wherein the seal is further defined as a first seal, and wherein the window assembly further comprises a second seal interposed between the mounting bracket and the cover to inhibit ingress of debris therebetween.

5. The window assembly as set forth in claim 4, wherein the mounting bracket further includes a coupling portion facing opposite the mounting portion; and
wherein the second seal is disposed around a perimeter of the coupling portion.

6. The window assembly as set forth in claim 1, wherein the mounting bracket defines a notch configured to receive a rearview mirror of a vehicle.

7. The window assembly as set forth in claim 1, wherein the first plastic material is a thermoplastic semi-crystalline polymer.

8. The window assembly as set forth in claim 1, wherein the first plastic material is selected from the group consisting of polybutylene terephthalate and polycaprolactam.

9. The window assembly as set forth in claim 1, wherein the second plastic material is a thermoplastic elastomer.

10. The window assembly as set forth in claim 9, wherein the thermoplastic elastomer is a thermoplastic urethane.

11. A method of forming a window assembly configured to house one or more sensors, the method comprising:
providing a transparent pane having an inner surface and an opposing outer surface;
forming a mounting bracket having a mounting portion defining a total mounting area bounded by a perimeter of the mounting portion, and defining a sensor aperture within the perimeter of the mounting portion, wherein the mounting bracket comprises a first plastic material having at least one of an elastic modulus of 1000 MPa or greater and a Shore D hardness of 70 or greater, and wherein the mounting bracket is configured to support the sensor such that the sensor is aligned with the sensor aperture;
coupling a seal to the mounting bracket along the perimeter of the mounting portion, the seal comprising a second plastic material, different than the first plastic material, and having at least one of an elastic modulus of 50 MPa or less and a Shore A hardness of 80 or less; and
coupling the mounting bracket to the inner surface of the transparent pane such that the seal engages the inner surface of the transparent pane to inhibit ingress of debris between the mounting portion and the inner surface of the transparent pane.

12. The method according to claim 11, wherein the step of coupling the seal to the mounting bracket further comprises overmolding the seal over the mounting bracket along the perimeter of the mounting portion.

13. A mounting system configured to support a component relative to a mounting surface of a vehicle, the mounting system comprising:
a mounting bracket including a mounting portion configured to be coupled to the mounting surface of the vehicle, the mounting bracket defining a component receptacle configured to support the component, wherein the mounting bracket comprises a first plastic material, and wherein the first plastic material comprises a thermoplastic semi-crystalline polymer having at least one of an elastic modulus of 1000 MPa or greater and a Shore D hardness of 70 or greater; and
a seal coupled to the mounting bracket and configured to engage the mounting surface of the vehicle to inhibit ingress of debris between the mounting portion and the mounting surface of the vehicle, wherein the seal comprises a second plastic material, different than the first plastic material, and wherein the second plastic material comprises a thermoplastic elastomer having at least one of an elastic modulus of 50 MPa or less and a Shore A hardness of 80 or less;

wherein the mounting bracket is formed from a first injection molding operation, and wherein the seal is formed from a second injection molding operation, subsequent to first injection molding operation, such that the seal is overmolded to the mounting bracket.

14. The mounting system as set forth in claim 13, wherein the mounting bracket defines a bracket channel, and wherein the seal is at least partially disposed in the bracket channel.

15. The mounting system as set forth in claim 13 further comprising a cover coupled to the mounting bracket for at least partially concealing the mounting bracket.

16. The mounting system as set forth in claim 13, wherein the first plastic material is a thermoplastic semi-crystalline polymer.

17. The mounting system as set forth in claim 13, wherein the first plastic material is selected from the group consisting of polybutylene terephthalate and polycaprolactam.

18. The mounting system as set forth in claim 13, wherein the second plastic material is a thermoplastic elastomer.

19. The mounting system as set forth in claim 18, wherein the thermoplastic elastomer is a thermoplastic urethane.

20. The mounting system as set forth in claim 13, wherein the component is further defined as a sensor, and the component receptacle is further defined as a sensor aperture extending through the mounting bracket; and wherein the mounting bracket is configured to support the sensor such that the sensor is aligned with the sensor aperture.

* * * * *